(12) United States Patent
Daellenbach et al.

(10) Patent No.: US 10,997,350 B1
(45) Date of Patent: May 4, 2021

(54) SEMICONDUCTOR CIRCUIT DESIGN AND UNIT PIN PLACEMENT

(71) Applicant: International Business Machines Corporation, Armonk, NY (US)

(72) Inventors: Lukas Daellenbach, Altdorf (DE); Ralf Richter, Unterhausen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/919,127

(22) Filed: Jul. 2, 2020

(51) Int. Cl.
*G06F 30/392* (2020.01)
*G06F 111/04* (2020.01)

(52) U.S. Cl.
CPC ........ *G06F 30/392* (2020.01); *G06F 2111/04* (2020.01)

(58) Field of Classification Search
CPC .......................... G06F 30/392; G06F 2111/04
USPC ........................................................ 716/122
See application file for complete search history.

(56) References Cited

U.S. PATENT DOCUMENTS

| 6,298,468 | B1 * | 10/2001 | Zhen ..................... G06F 30/392 |
| | | | 716/122 |
| 9,201,999 | B1 * | 12/2015 | Sahni .................... G06F 30/398 |
| 10,235,490 | B1 * | 3/2019 | Mallon ................. G06F 30/394 |
| 10,810,341 | B1 * | 10/2020 | Ravishankar ........... G06F 30/30 |
| 2006/0053396 | A1 * | 3/2006 | Eng ......................... G06F 30/39 |
| | | | 716/105 |
| 2006/0267612 | A1 * | 11/2006 | Hamazaki ............. G06F 30/392 |
| | | | 716/101 |
| 2009/0288054 | A1 * | 11/2009 | Okamoto ................ G06F 30/39 |
| | | | 716/122 |
| 2016/0232275 | A1 * | 8/2016 | Dixon ................... G06F 30/392 |
| 2017/0161406 | A1 | 6/2017 | Ankenapalli |
| 2019/0012424 | A1 | 1/2019 | Brookshire |
| 2019/0258767 | A1 * | 8/2019 | Young .................. G06F 30/392 |

* cited by examiner

*Primary Examiner* — Suresh Memula
(74) *Attorney, Agent, or Firm* — Christopher M. Pignato

(57) ABSTRACT

A semiconductor circuit design method, system and computer program product for placing a unit pin on a boundary of a unit of a semiconductor circuit to be designed may be provided. Pin position data is received, wherein the pin position data comprises a chip pin position of a chip pin within the chip area and outside of the unit of a semiconductor circuit, to which the unit pin is to be electrically connected. The coordinates of a center point of the unit are determined, as well as a line crossing the center point and the chip pin position. The unit pin is placed on an intersection of the boundary of the unit and the line crossing the center point.

25 Claims, 9 Drawing Sheets

SEMICONDUCTOR CIRCUIT DESIGN AND UNIT PIN PLACEMENT

BACKGROUND

The invention relates generally to chip layouts of a semiconductor and more specifically, to semiconductor circuit designs placing a unit pin on a boundary of a unit of a semiconductor circuit.

Proper chip design remains one of the areas in which experience matters a lot, even though developers and chip designers are supported by highly sophisticated tools and abstraction languages, for example, VHDL (Very Highspeed integrated circuit Hardware Description Language). Typically, a large complex semiconductor circuit and the form of a chip are not designed by one developer or a small team, but by a plurality of teams working on different units of the semiconductor chip. At the beginning of the design process, the teams focusing on different functional units, may only loosely work together, i.e., they start to design their specific unit without incorporating direct requirements from other units. However, during later stages of the design, different teams can collaborate to optimize the final semiconductor product. For example, the wiring between the different units using different signal paths on different metal layers can be designed at a later stage in the development process. Further, collaboration between the different teams can optimize the final product. For instance, in order to achieve short lengths of the wires between different units during the wiring phase, the positions of the various units, relative to one another are considered. If a second unit is positioned "south" of a first unit, then in an optimal case, the connection wire between the first and the second unit should not leave the first unit at its "north "side.

As an additional aspect, it may also be taken into account that some changes to the pin placements of units may happen very late in a design process. Thus, a method to interconnect units on a newly designed chip may need to be highly flexible, but at the same time allow a high degree of optimization. In this context, it should be kept in mind that the units of the chip being designed are composed of several blocks of macros, for example, Regression Analysis and linear Model (RLMs), registers, caches, etc. that are combined into the units. A plurality of units may be constructed as cores or complete semiconductor chips. In order to connect the units to each other or to input/output (I/O) pins, unit pins placed at the boundary of a unit are used as endpoints for electrical connections to other units. In the initial phase of the development, unit pins may be defined and positioned but may not initially have electrical connections to units.

US patent publication number 2016/0232275 A1 discloses a "method, a system, and a computer-readable medium . . . that enable efficient design processes for integrated circuits. In particular, tools are described which enable integrated circuit designers to visualize an integrated circuit design without combinational logic and, from such visualization, identify locations in the design of common node logical connectivity."

Further, US patent publication number 2006/0053396 A1 discloses an "electronic design automation system" providing optimization of Register-Transfer Level (RTL) models of "electronic designs, to produce detailed constraints and data precisely defining the requirements for the back-end flows leading to design fabrication. The system takes the RTL model of an electronic design and maps it into an efficient high-level hierarchical representation of the hardware implementation of the design."

However, despite the teachings of US 2016/0232275 and US 2006/0053396, the problem of positioning unit pins remains due to the complexity of the wiring optimization. The wiring between the units and the internal structure of the units should, in the best case, be taken into account when optimizing the metal wire layers. Accordingly, there is a need for a mechanism to optimally place unit pins during the chip design process.

SUMMARY

Embodiments of the present disclosure address the need for a way to optimally place unit pins during the chip design process of a semiconductor circuit. One aspect of the present disclosure provides a method for designing a semiconductor circuit in a manner that optimally places the unit pins by taking into account the wiring between the units and the internal structure of the units when optimizing the metal wire layers. The method comprises receiving pin position data, wherein the pin position data comprises a chip pin position of a chip pin within the chip area that is positioned outside of the unit to which the unit pin is configured to be electrically connected. The method further comprises determining coordinates of a center point of the unit, determining a position of a line extending from the center point of the unit through the chip pin position and placing the unit pin at a point of intersection where a boundary of the unit intersects the line extending from the center point of the unit through the chip pin position.

An additional aspect of the method for designing the semiconductor circuit can further include defining the line extending from the center point of the unit through the chip pin position by a function and varying at least one parameter of the function until an overlap of the unit pin's placement and previously placed unit pins are avoided. Preventing the placement of multiple unit pins within the same location on the boundary of the unit.

Another aspect of the method for designing the semiconductor circuit may further include the steps of placing multiple unit pins iteratively, wherein an order of placing the unit pins is prioritized based on design constraint information. In some embodiments, the design constraint information comprises a set of metal layer positions within the semiconductor circuit that are usable for placing the unit pin thereon. Optionally, the usability of the set of metal layer positions for placing the unit pin thereon can be based on a length of a line extending between the chip pin and the unit pin, and wherein the method comprises sorting the unit pins according to the length of the of the lines extending between the chip pin and respective unit pin being placed.

According to another aspect of the present disclosure, a system for designing a semiconductor circuit design may be provided. The system may comprise a receiver configured to receive pin position data, wherein the pin position data may comprise a chip pin position of a chip pin within a chip area that is outside of the unit to which the unit pin is configured to be electrically connected. Additionally, the system may comprise a determination module configured to determine coordinates of a center point of the unit, a second determination module configured to determine a position of a line extending from the center point of the unit through the chip pin position; and a positioning module configured to place the unit pin at a point of intersection where a boundary of the unit intersects the line extending from the center point of the unit through the chip pin position.

Furthermore, embodiments may take the form of a related computer program product for designing a semiconductor circuit, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

Another aspect of the present disclosure includes a computer system comprising at least one processor, a semiconductor design system coupled to the at least one processor, the semiconductor design system comprising a receiver, a first determination module, a second determination module and a positioning module; and a computer-readable storage media coupled to the at least one processor. The computer-readable storage media of the computer system contains program instructions executing a computer-implemented method wherein said computer-implemented method comprises: receiving, by the at least one processor, pin position data from the receiver, the pin position data comprising a chip pin position of a chip pin within a chip area that is positioned outside of a unit to which a unit pin is configured to be electrically connected; receiving, by the at least one processor, coordinates of a center point of the unit determined by a determination module; positioning, by the at least one processor, a line extending from the center point of the unit to the chip pin position; and instructing, by the at least one processor, placement of the unit pin on a boundary of the unit, where the line extending from the center point of the unit to the chip pin position intersects the boundary of the unit.

Additional aspects of the present disclosure include a computer-implemented method comprising: receiving, by a processor, a chip pin coordinate file comprising x,y coordinates of a unit, and x,y coordinates of a chip pin; establishing, by the processor, a center point of the unit based on the x,y coordinates of the unit; extending, by the processor, a pin line from the center point of the unit to the x,y coordinates of the chip pin; identifying, by the processor, an intersection point, wherein the pin line intersects with a boundary of the unit as the pin line extends from the center point of the unit to the x,y coordinates of the chip pin; and confirming, by the processor, that a pin is not positioned at the intersection point, and upon confirmation that the pin is not positioned at the intersection point, placing, by the processor, a unit pin on the boundary of the unit at the intersection point.

BRIEF DESCRIPTION OF THE DRAWINGS

Embodiments of the present invention are described with reference to different subject-matters. In particular, some embodiments are described with reference to method type claims, whereas other embodiments are described with reference to apparatus, computer program products or system-type claims. However, a person skilled in the art will gather from the above and the following description that, unless otherwise notified, in addition to any combination of features belonging to one type of subject-matter, also any combination between features relating to different subject-matters, in particular, between features of the method, system, computer program products and apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
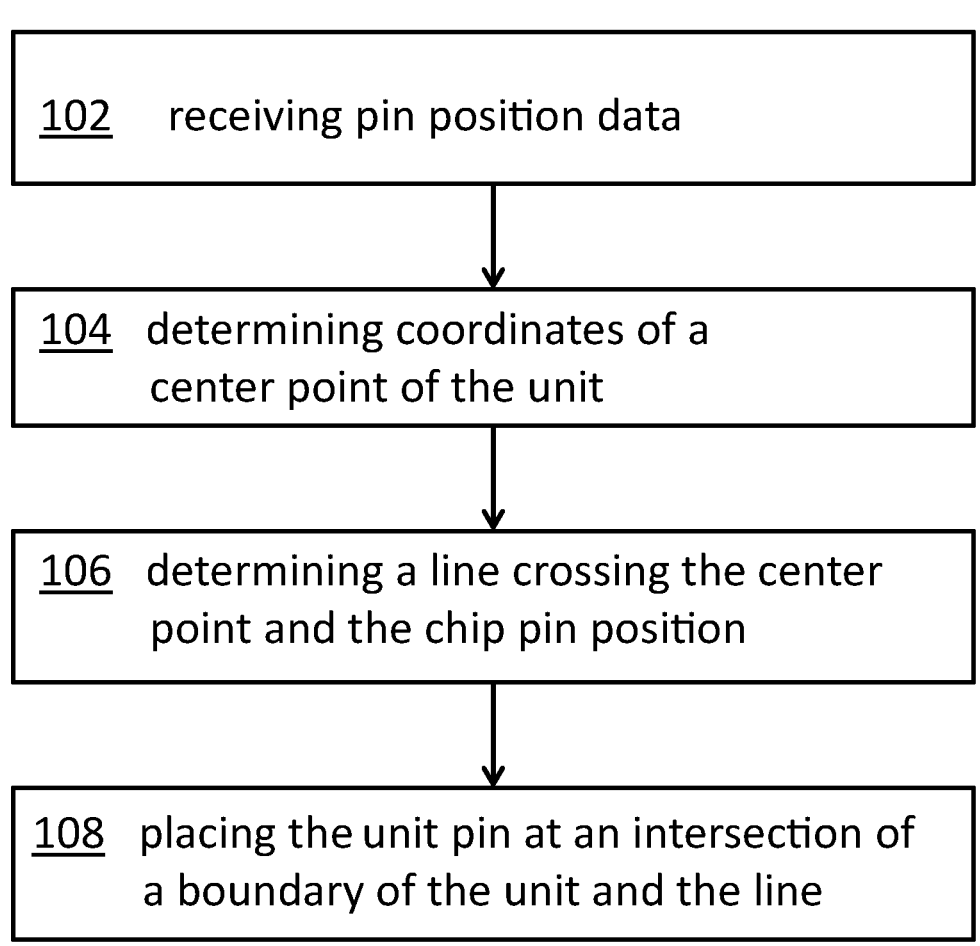

Preferred embodiments of the invention will be described, by way of example only, and with reference to the following drawings:

FIG. 1 depicts a flow chart describing an embodiment of a semiconductor circuit design method for placing a unit pin on a boundary of a unit of a semiconductor circuit.

Figure 2:
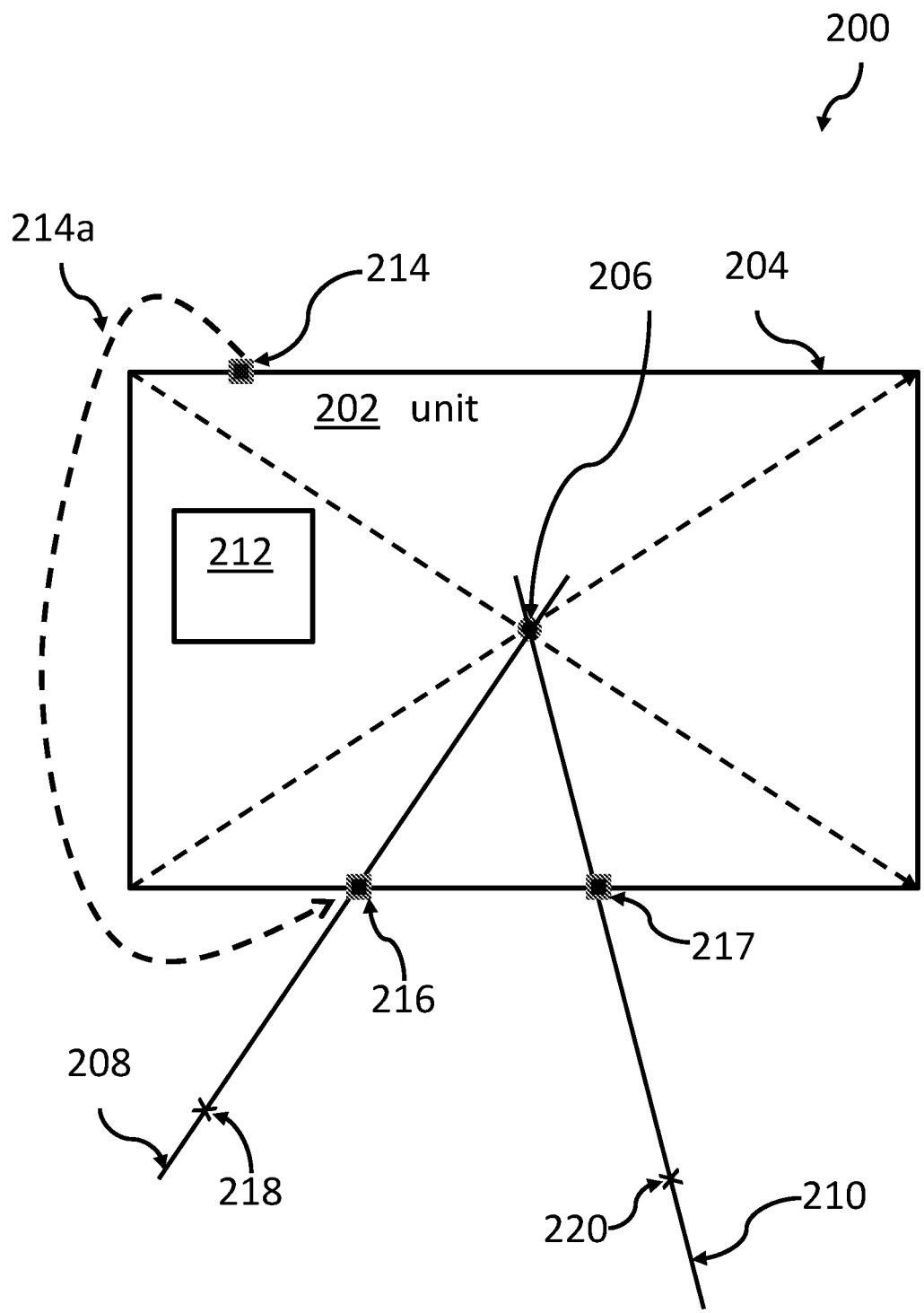

FIG. 2 depicts a diagram of an exemplary embodiment of unit, describing the positioning of a unit pin positioned inside a unit and a chip pin.

Figure 3:
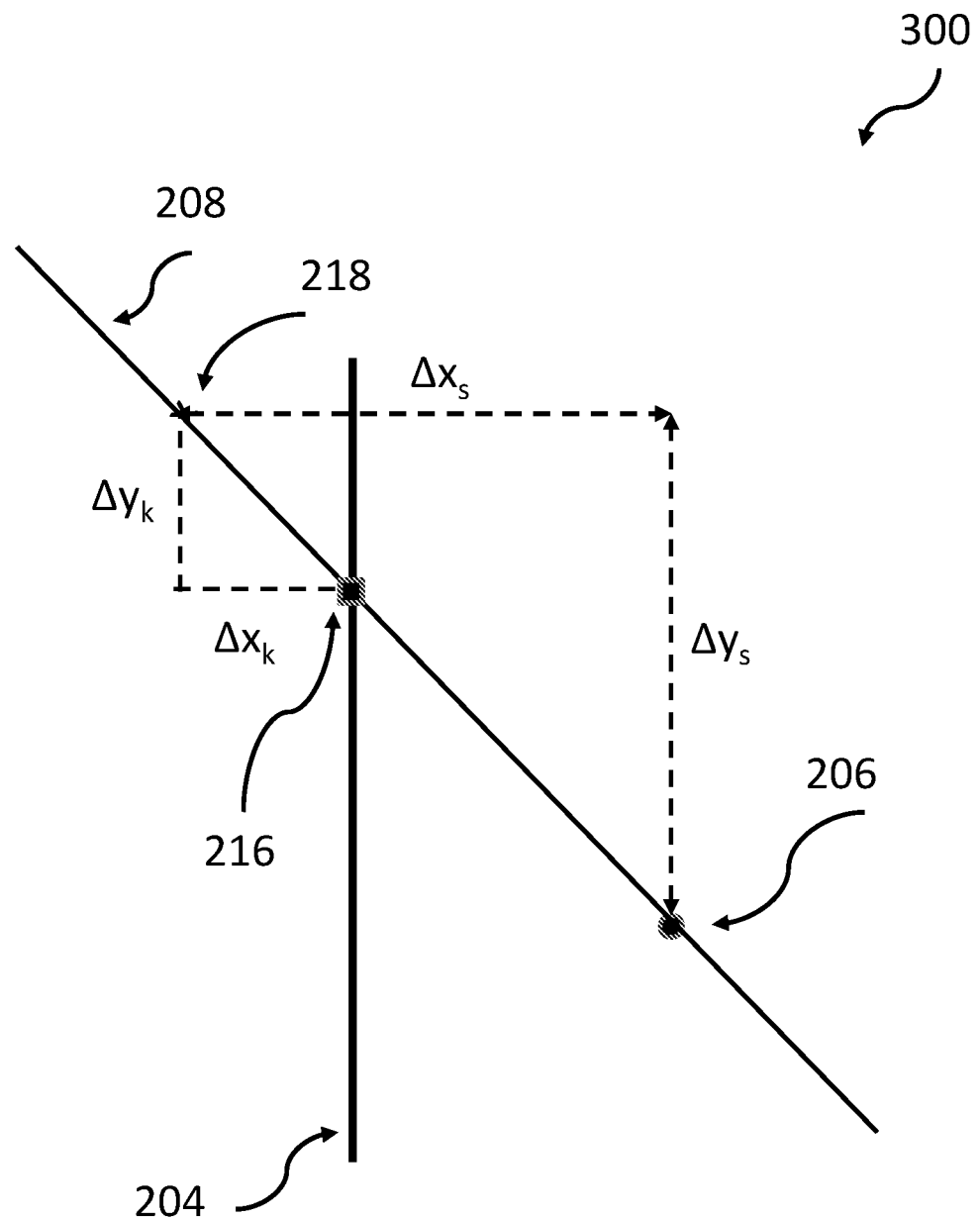

FIG. 3 depicts a diagram of another exemplary embodiment describing placement of the unit pin and a chip pin.

Figure 4A:
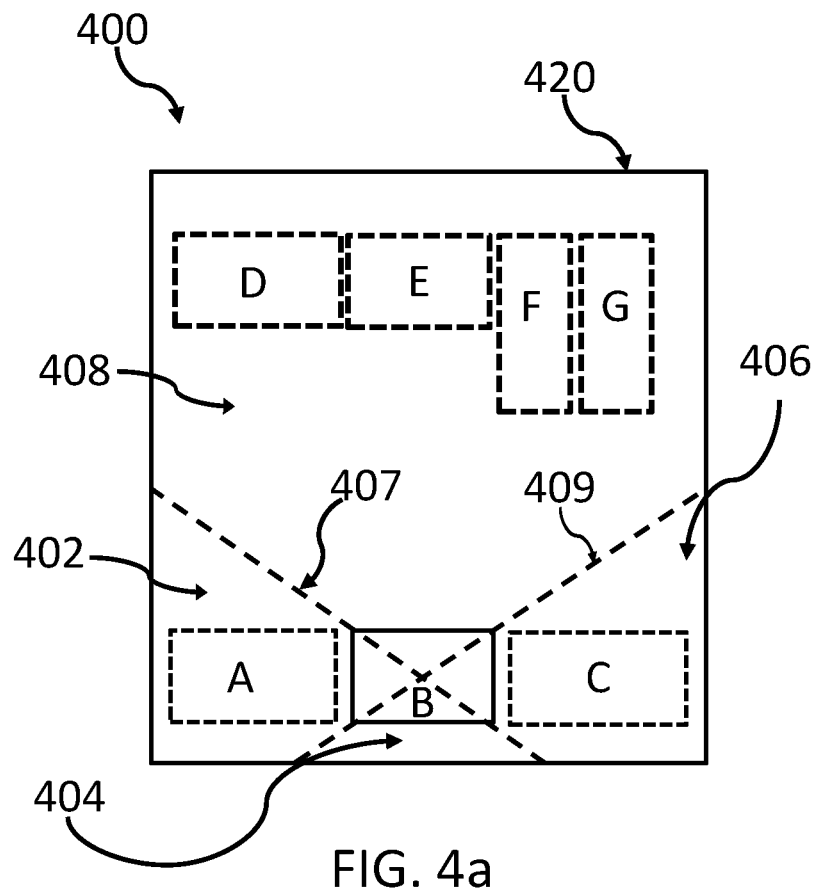

FIG. 4a depicts a diagram of an embodiment depicting several units of a semiconductor circuit configured to be electrically connected on a semiconductor die.

Figure 4B:
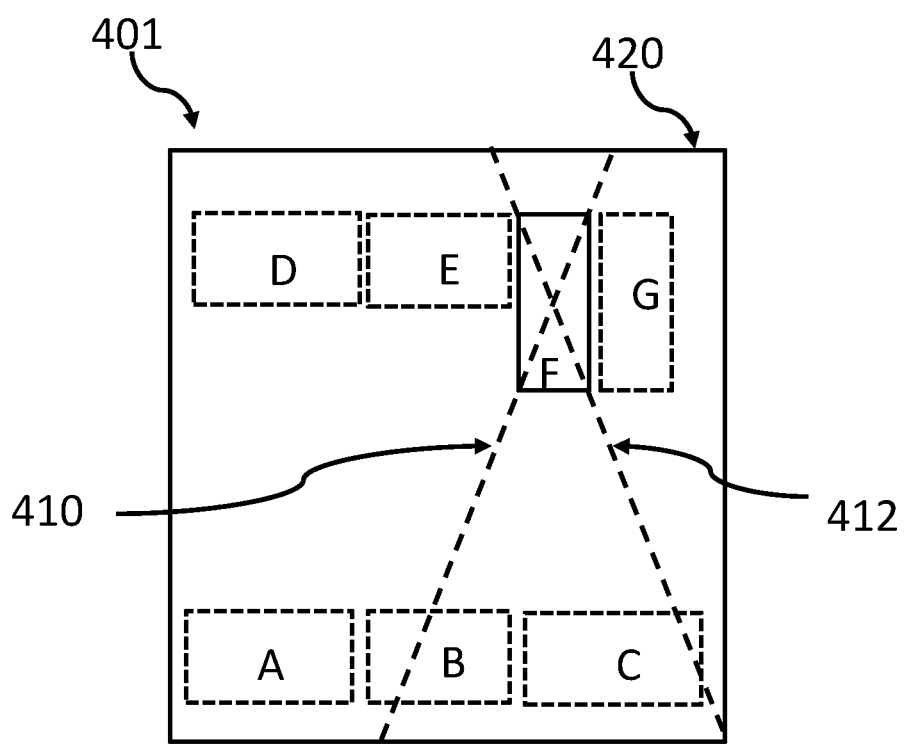

FIG. 4b depicts a diagram of an alternate embodiment of a semiconductor die depicting a plurality of units configured to be electrically connected on the semiconductor die.

Figure 5A:
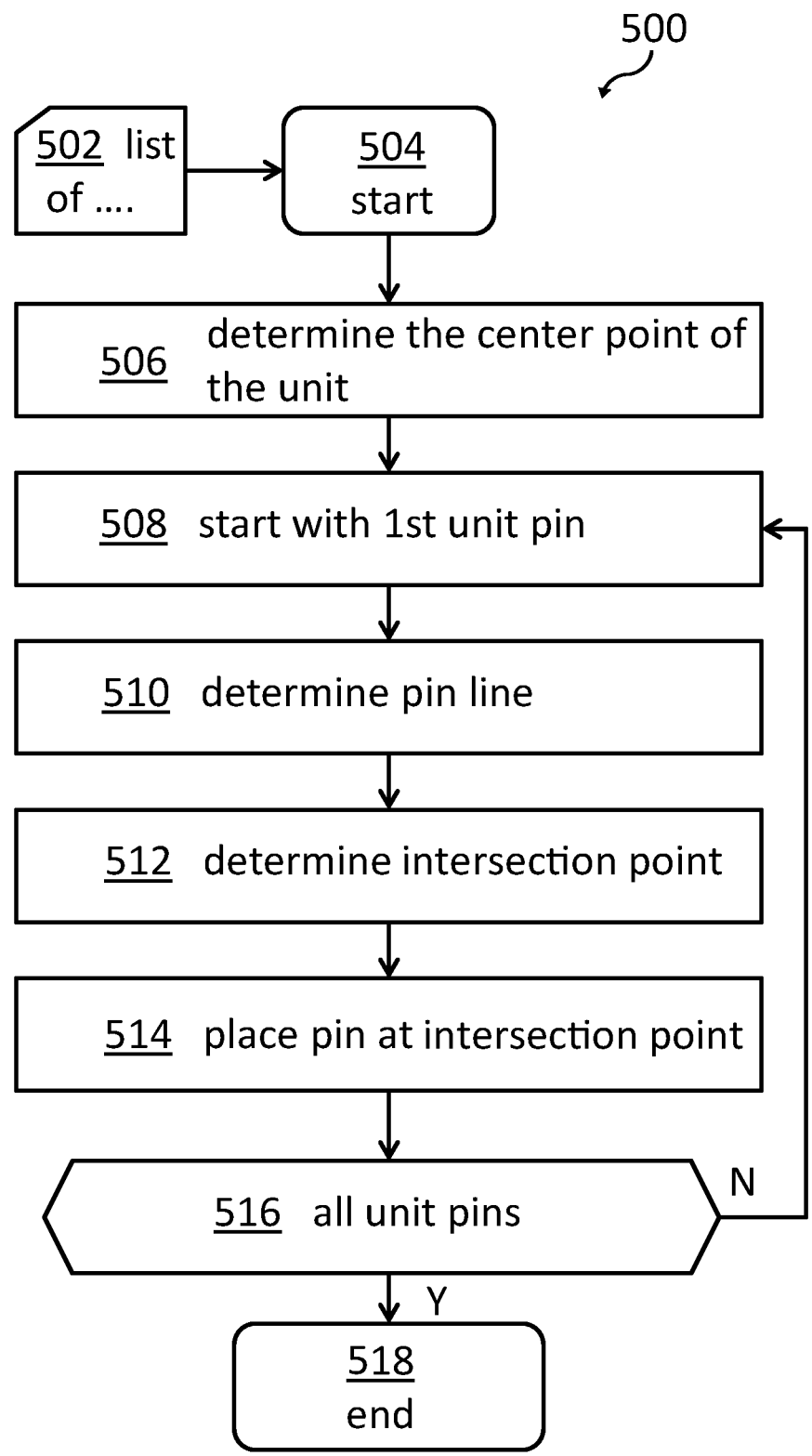

FIG. 5a depicts a flowchart describing an embodiment of a method for the placement of unit pins in a semiconductor circuit.

Figure 5B:
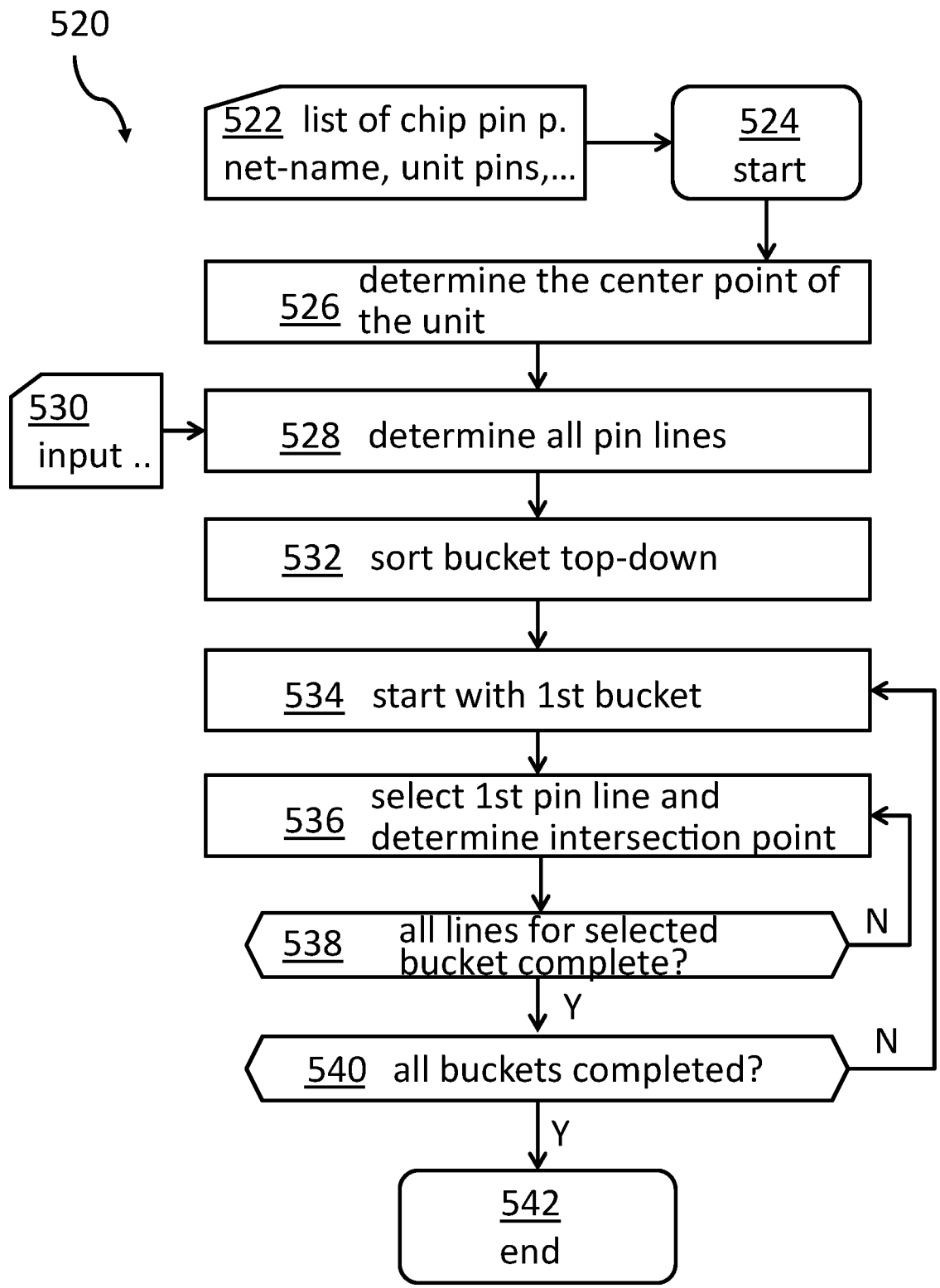

FIG. 5b depicts a flowchart describing an alternative embodiment of a method for placing unit pins in a semiconductor circuit.

Figure 6:
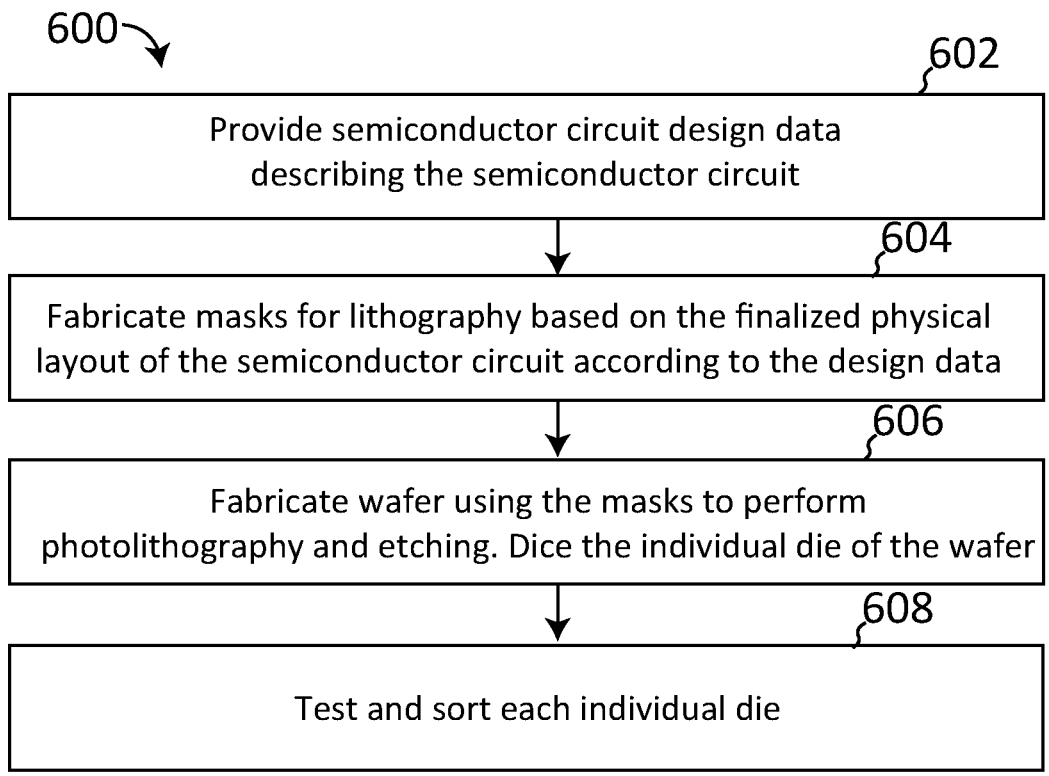

FIG. 6 depicts a flowchart depicting an embodiment of a method for having a semiconductor circuit fabricated using a semiconductor circuit designed in accordance with the method depicted in FIG. 5a, FIG. 5b and/or as described in this application.

Figure 7:
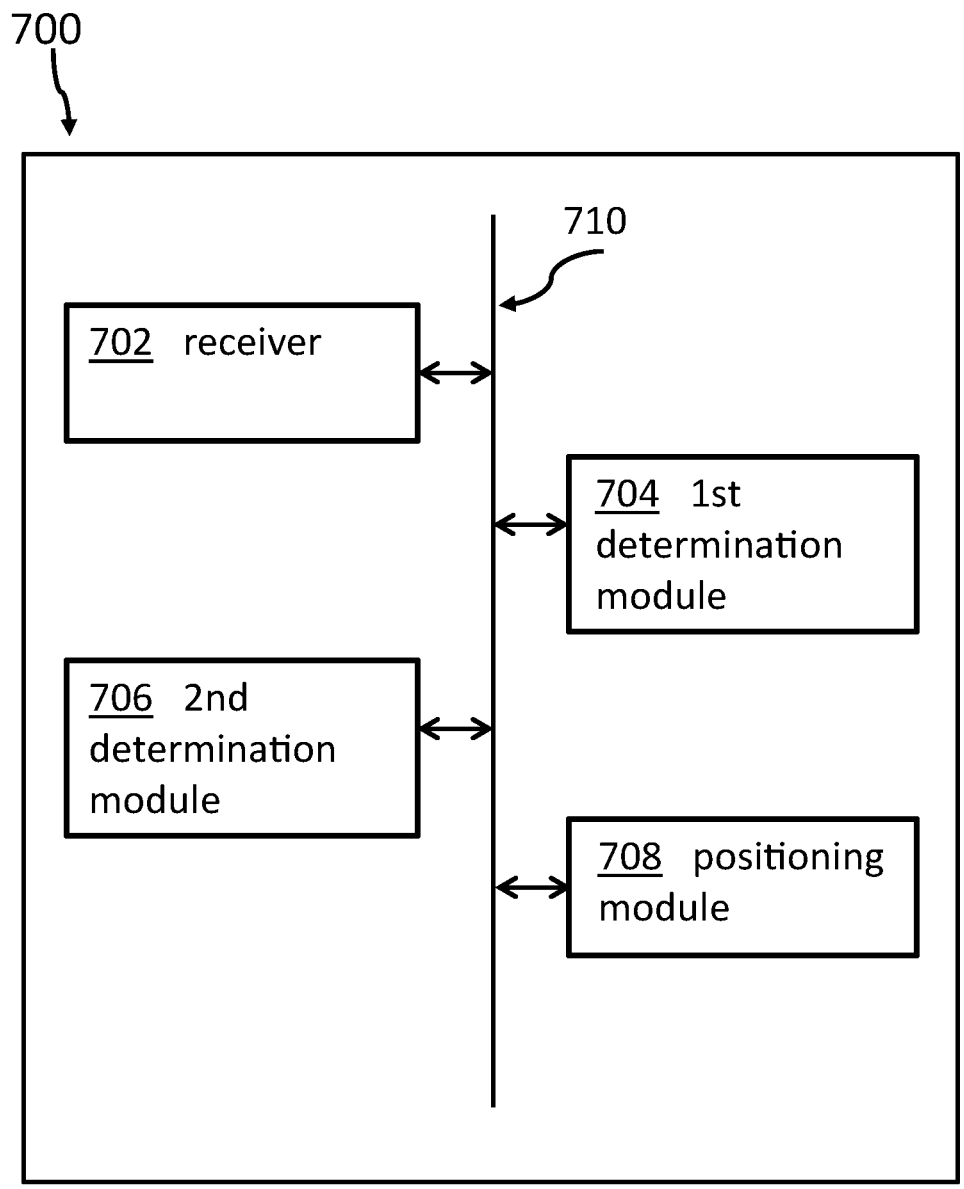

FIG. 7 depicts a block diagram of an embodiment of a system for designing a semiconductor circuit.

Figure 8:
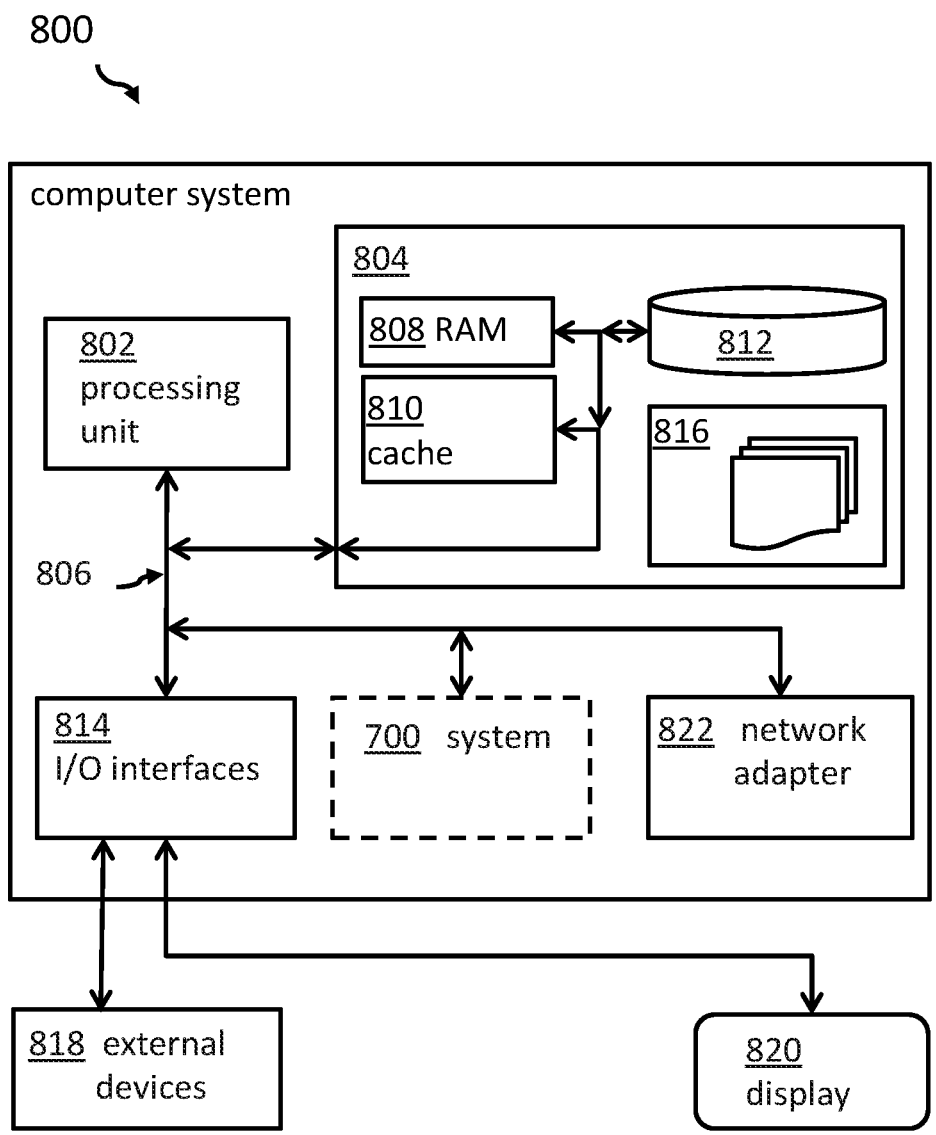

FIG. 8 depicts an embodiment of a computing system comprising the system according to FIG. 7.

DETAILED DESCRIPTION

In the context of this description, the following conventions, terms and/or expressions may be used:

The term "unit pin" may denote a connection point of a functional unit of the semiconductor circuit (the chip), wherein the unit pin is positioned on a boundary (typically rectangular) of the unit. All unit pins can be combined to define an interface of a unit to the rest of the chip. A semiconductor circuit may typically comprise a plurality of units which may selectively be connected with each other.

The term "boundary" may denote a border of a unit. For example, a rectangular or another shape forming a perimeter around a unit. In some embodiments, the geometrical shape of the unit may be convex.

The term "unit" may denote a functional group of interacting devices within a semiconductor circuit or chip. A unit may be connected using metal layers within the chip and can be connected to other unit pins of other units that form the semiconductor circuit.

The term "semiconductor circuit" may denote an interconnected set of semiconductor devices integrated on a carrier material. For example, a carrier material may include a semiconductor bulk material, a substrate and/or an isolator. The semiconductor circuit may comprise a plurality of semiconductor devices and interconnect the semiconductor devices using a plurality of metal wiring layers. In some instances, up to millions of semiconductor devices may be interconnected at a time. In some embodiments, subgroups of the semiconductor devices may be combined to units within the complete device.

The term "chip pin" may denote a connection point within a semiconductor device of a larger integrated semiconductor circuit. In some instances, only the position of the chip pin may be known (on a need-to-know basis). For establishing the connections within the semiconductor device, it may not be required to know to which unit the chip pin belongs to. In some embodiments, the chip pin may also be connected to an I/O pin. The "I/O pin" may refer to a connector that is positioned on the exterior surface of the chip. In instances where the chip pin position may not yet be known, the coordinates of the related unit may be used instead.

The term "center point" may denote a geometrical balance point. In some embodiments, the center point may be a center point of a unit. In embodiments where the boundary of the unit is a rectangle, the center point may be the intersection point of two diagonals lines extending from the corners (i.e. the vertex) at the edge of the rectangle (for example, as shown in FIG. 2).

The term "line" may denote a geometric line extending infinitely in both directions or in some cases extending between two points on a geometric plane and/or extending between planes. For example, a line extending from the center point of a unit to the chip pin. The line may be a straight line or, in some embodiments, a curved line.

The term "intersection point" may refer to a position of intersection where a line extending from the center of the unit through the chip pin position crosses and unit boundary. In other words, a crossing point wherein the line crosses the unit boundary.

The disclosed computer-implemented semiconductor circuit design methods, systems, and computer program products for positioning unit pins on a semiconductor circuit may offer multiple advantages, technical effects, contributions and/or improvements:

The disclosed embodiments, including methods, computer program products and systems, may provide an optimized placement of unit pins at different phases of the chip design. By integrating a view of the unit, itself and the direction in which a chip pin is positioned within the design, the disclosed embodiments make it possible to determine the most suitable position of the unit pin on the unit boundary.

The proposed solutions described by the embodiments herein are not only helpful and useful in the beginning of the design process but also in later phases of the design process. Even in such instances where additional pins can be placed to establish additional connections between units that may need to be integrated into an almost final chip design. For example, in a unit that has a rectangular boundary, the semiconductor circuit may be designed by selecting a unit pin position located along the line extending from the center of the unit through the chip pin to establish an electrical connection. However, in some instances, other pins may have previously been placed in the proposed unit pin location or areas that are blocked and unable to accept the desired unit pin position. Embodiments of the present disclosure can recognize if the area at the intersection point is blocked by another pin. For example, due to the presence of another unit pin, a power pin or clock pins. Embodiments of the present disclosure may be instrumental for finding a next free location for a unit pin or searching a higher metal layer for a free location to place the unit pin.

In later phases of the chip design, the chip developers may use a detailed timing description of the interfaces and circuits. In accordance with these phases of chip design, embodiments of the present disclosure support placing the unit pin to reflect those timing requirements. For example, by placing a unit pin on a metal layer which is able to support those timing requirements. For critical connections, higher, more expensive metal layers may be used, which may allow faster interconnections and interconnections over longer distances.

Thus, the disclosed embodiments described herein may allow a very flexible solution for an optimized placement of new unit pins and repositioning previously existing unit pins during later phases of the semiconductor design process.

In the following, embodiments applicable to the method as well as related system and computer program products are described:

In some embodiments, the center point of the unit may correspond to a geometric or gravitational center of an area of the unit. The geometric or gravitational center of the unit may be a practical choice because the center may be easily determined, in particular if the shape of the unit is a simple geometric shape. For example, a rectangle or a triangle, because a mathematical center may be determinable. This may also be the case for convex shaped unit designs.

According to some embodiments, a center point of another unit may be used as the chip pin position. This may be particularly useful if the other unit is not right beside or adjacent to the unit for which the unit pin is being placed. Optionally, the pin to which the chip pin position belongs may also be an input/output pin, i.e., a connection to the outside of the integrated semiconductor device. Basically, any position that may be describable by the netlist of the integrated semiconductor device may be used as chip pin position.

According to an exemplary embodiment of the method, the unit may have a convex geometry and more specifically, the geometry may have a rectangular shape. However, other forms and shapes may be possible. For example, an L-shape or a U-shape. In such cases with alternative shapes, specialized definitions and determination methods for the center or the center point of the unit may be used to ensure that the internal connection point, to which the unit pins are intended to be connected, lies inside the boundaries of the unit. Consideration of the unit shape may be taken into account because, in general, a concave shape may have the center of gravity (which may also be used as center of the unit shape) outside the unit's boundary.

According to some embodiments, the line extending from the center point of a unit to (or through) the chip pin may be a straight line crossing the center point of the unit and the chip pin. Extending a straight line across the unit may be the easiest way to determine the intersection point of the line and the border or boundary of the unit. For example, where the points of two lines intersect. Alternatively, and according to other embodiments, the line may also be defined by a function defined by the plane that forms the semiconductor's surface within an x-y plane. For example, the function may be a polynomial function in the notation of y=F(x) (or any other, like sin, tan, $e^x$, . . . ). Embodiments described herein may vary at least one parameter of the function until an overlap of the unit pin to be placed and previously placed unit pins are avoided. Thus, preventing new unit pins and existing unit pins from being placed in the same location.

In additional embodiments, the unit boundary may have theoretically available positions along the unit boundary, which may have a predefined regular grid distance to each other, such that the closest one of the theoretically available positions of the intersection point between the line from the center through the chip pin (either based on a line of a function) may be selected.

Embodiments described herein may also comprise placing multiple unit pins iteratively, wherein an order of placing the unit pins may also be based on design constraint information. Design constraint information that influences placement of unit pins may include timing constraints, a position of a Voltage Drain Drain ($V_{dd}$) and/or ground, blockage areas, and so on. Different required connections to chip pins may have different constraints. Thus, it may be useful to place unit pins onto the semiconductor circuit with tighter underlying constraints or with constraints that are more difficult to meet first. In some embodiments, a constraint for placing the unit pin may be a preselected side of the unit border. For example, a chip designer may preselect or predetermine a specific side (top, bottom, left, right side) of the unit for a superordinate reason.

According to another embodiment, the design constraint information may also comprise a set of metal layer positions within the semiconductor circuit that may be usable for placing the unit pin (e.g., in combination with free places on the unit boundary). Hence, the constraints may be complex and may have multi-dependencies. Predefined rules may help to set the best priorities and thus an optimized order for the iterative approach. In some embodiments, the set of usable metal layer positions may be determined based on a length of the line between the chip pin being placed onto the semiconductor and the unit pin. Additionally, the method may comprise sorting the unit pins being placed onto the semiconductor according to the length of the lines between the chip pin and the respective unit pin. Moreover, in some embodiments, the determination of the usable metal layer positions based on length may be reflected as a constraint and may be combined with and considered alongside one or more additional constraints, described by the constraint information as discussed in detail above.

FIG. 1 depicts an exemplary embodiment of a flow chart of the semiconductor circuit design method 100 for placing a unit pin on a boundary of a unit of a semiconductor circuit (i.e., the chip being designed by the method). During step 102 of the method 100, pin position data is received. The pin position data may be received as part of the net information, otherwise referred to as the "netlist." The pin position data may comprise a description of at least one chip pin position within the chip area positioned outside of the boundaries of the unit to which the unit pin is configured to be electrically connected. Examples of the chip position described by the position data may include a description as x-y coordinates, and a description as relative locations of the semiconductor (e.g., a lower left corner of the semiconductor circuit). The actual unit and the other unit may be connected to the same network of interconnected components (referred to as the "net" or "nets"). However, in some instances, the chip pin may also represent a place of another unit, or the chip pin may also be an I/O pin of a chip (i.e., a pin that connects to outside the chip).

In step 104 of method 100, coordinates of a center point of the unit are determined, and in step 106, a position of a line extending or crossing the center point of the unit and extending to (or through) the chip pin position is determined. For instance, the line being determined in step 106 may be a straight line in some instances, or a polynomial line that may comprise one or more curved features. In step 108, the method 100 may place the unit pin on an intersection of a boundary of the unit and the line (i.e. where the line from step 106 intersects with the boundary of the unit). For example, the step of placing the unit pin on the intersection of the boundary of the unit and the line may be performed by selecting a position of the new unit pin from the netlist. This process of method 100 can be used throughout the chip design and is not limited to a specific phase of the design process of the chip. It should be noted that in the exemplary embodiments, the unit pin position can be positioned between the center of the unit and the chip pin.

FIG. 2 shows a diagram 200 of an exemplary unit 202. As shown, the diagram 200 depicts a pin 212 inside the unit 202 and a chip pin 218 and/or alternatively chip pin 220. It may be assumed that a pin 212 of the sub-unit (indicated as a rectangle inside the unit 202) of the unit 202 may be connected to the chip pin 218 or 220. Hence, the question is where to place the unit pin 214, 216, 217 on the boundary 204 of the unit 202? While it may seem straightforward to place the unit pin 214 at the position indicated on the top boundary of the boundary 204 of the unit 202 or alternatively place the unit pin 214 on the left side (not shown) of the boundary 204 because this may be considered the shortest pathway to the boundary 204 from the pin 212. Such a construction of the unit 202 would be disadvantaged because the wiring from the unit pin 214 to either the chip pin 218 or chip pin 220 may have to circumvent around the border of unit 202.

Hence, in accordance with the proposed embodiments, unit pin 216 or unit pin 217 could be positioned on the "southern" border of the unit boundary 204, depending on whether a connection should be established to chip pin 218 or to chip pin 220. Thus, if making a connection to chip pin 218, the already positioned unit pin 214 is repositioned to the unit pin 216 as indicated by the dashed line 214a. The way to find the position of unit pin 216 as shown, is by constructing a line 208 from the center point 206 of the unit 202 to the chip pin 218 (and similarly to the chip pin 220 by line 210 in the instance wherein a connection is being made to chip pin 220). The unit pin 216 is placed on the point of intersection (i.e. the crossing point) along the boundary 204 (the side of the unit between its center point 206 and the chip pin 218), wherein the border of the boundary 204 is chosen that is intersected by a line drawn from the center point 206 of the unit 202 to the chip pin 218.

FIG. 3 shows a diagram 300 of another exemplary placement of unit pin 216 and a chip pin 218. A determination of the intersection point between line 208 and boundary 204 may be made by determining the inclination of the line 208 between the center point 206 of the unit 202 and the chip in 218. The relation of the x-sides ($\Delta x_k/\Delta x_s$) is equal to the relation of the y-sides ($\Delta y_k/\Delta y_s$)=k. Thus, the intersection point (or crossing point) on a vertically boundary 204 of unit 202 can be determined as $x_{cross}=x_{unitline}$ if $x_{PinxA} \leq x_{Center\ of\ Gravity}$; therefore, $y_{cross}=k*\Delta y_s + y_{Center\_of\_Gravity}$. Alternatively, if the intersection point lies on a horizontal boundary 204 of the unit 202, then $y_{cross}=y_{unit\ border}$ and $x_{cross}=k*\Delta x_s + y_{Center\ of\ Gravity}$.

The information determining the intersection point on the boundary 204, based on the location of the center point 206 and chip pin 218, 220, may be summarized in a chip pin coordinate file. The chip design determines where the nets (i.e., in the netlist) are initially connected to the unit 202 (i.e., where the respective sources are positioned), or where they end (i.e., where the sink is positioned). This is valid for nets between units 202, but also between units 202 and the chip connectors, for example I/O pins.

An example of the format of such an associated pin chip coordinate file may be:
    net_name, xy-coordinate-unit (core), xy-pin-coordinate within the unit (core).
In other instances, the pin chip coordinate file may be managed by the following format:
    net_name, xy-coordinate-chip, xy-pin-coordinate within the chip,
    net_name, xy-coordinate-buffer (inventor), xy-pin-coordinate within the buffer (or converter).

If the exact pin position on the chip is unknown, only the xy-coordinate of the unit may be available in the chip pin coordinate file. The algorithm will use this information accordingly.

As mentioned above, other connection lines between the center of gravity of the unit 202 and the external pin, i.e., the chip pin 218, 220, may be used, besides a straight line. For example, a polynomial function including a square function, or higher dimensional functions, or types of lines comprising one or more edges and/or curves may be used. These functions may cross the center of the unit 202 and the chip pin 218, 220 position. Additionally, the difference between the unit pin 214, 216, 217 position determined by the proposed method described herein and other exemplary embodiments for determining the intersection point (for example, by the linear function) may be minimal. Furthermore, the semiconductor designs may take into account that there is no overlap with power or other signal pin lines. Thus, the determined unit pin 214, 216, 217 position may be moved to a free pin position, for example, according to a predefined distance of unit pins or a predefined grid of unit pins, in order to avoid conflicts with other constraints and pin placements.

FIGS. 4a, 4b show diagrams 400, 401 comprising a plurality of units A-G configured to be electrically connected on a semiconductor die 420. FIG. 4a shows the units A, B, C, D, E, F and G for a better understanding of placing the unit pins according to the proposed embodiments described herein. The aspect ratio of the sides of each unit A-G may determine the length of the diagonals 407, 409, 410, 412 passing through the center point of the unit A-G. These separate chip areas resulting from the diagonals 407, 409, 410, 412 passing through the center of a unit A-G, form four partial areas 402, 404, 406, 408, denoted herein as 'diagonals' (triangles or other resulting shapes which may be cut at the boundary of the chip die). This happens in a way that each unit side relates to a larger and a smaller area. It can be assumed that all nets of a unit A-G are connected to chip pins which may be positioned in one of these four partial areas 402, 404, 406, 408 during the design of a particular unit A, B, C, D, E, F, or G. The positions of the chip pins determine on which side of the unit A-G (i.e., which border of the unit border), the unit pin is to be positioned.

Using the four diagonals concept, it is determined how many unit pins can be positioned per unit side. The number of these pins corresponds to the number of chip pins within this area. However, this function may be seen as optional because it is not always required to determine in which of the diagonal areas the chip pin is positioned because the line (see above) determines the correct side of the unit for the placement of the unit pins. If instead of the endless line, a distance line is drawn from the center of the unit to the unit pin, the correct border side of the boundary of the unit can be determined automatically.

In FIG. 4b an example is shown depicting the diagonal concept. In this case, unit F is being connected to the chip pins. For example, if the lower side of the unit F determines the area between the diagonals 410 and 412 and determines which unit pins should be positioned on the lower boundary line of unit F. Likewise, in FIG. 4a, chip pins positioned within the diagonal comprising area 404, formed between the diagonals 407 and 409 may have their corresponding unit pin positioned upon the boundary line running along the lower side of the unit B. Chip pins that lie within area 406, as formed by the diagonals 407, 409 may have their unit pins positioned along the right-side border lines of the unit B.

FIG. 5a shows a flowchart 500 depicting an embodiment of a method for placing unit pins in a semiconductor. A list 502 comprising chip pin positions, a net-name, a unit identifier, and optionally one or more additional details is/are used and read to start 504, the placement procedure. In step 506, the center point of the unit is determined. In step 508, the procedure starts with the first unit pin. In step 510 a determination of the position of the pin line (i.e. line 208, as shown in FIG. 2) between the center point of the unit and the chip pin position is made. In step 512, the determination of the intersection point (i.e. as shown by unit 216, 217 in FIG. 2) between the pin line and the boundary of the unit is performed. In step 514, the unit pin is positioned on the determined intersection point or the unit pin is repositioned to the position of the intersection point.

During step 516, a determination of whether all unit pins have been positioned is performed. If not all of the unit pins have been positioned, the method returns back to step 508 and starts with the next, not yet positioned unit pin. Conversely, if in step 516 the determination is made that all unit pins have been positioned, the procedure proceeds to step 518 and ends. In some embodiments, upon completion of the method for designing semiconductor circuit at step 518, the design of the semiconductor circuit may be outputted and/or stored as physical data (i.e. semiconductor design data). Embodiments of the semiconductor design data describing the semiconductor circuit may be used in the fabrication of the semiconductor circuit in accordance with the design described by semiconductor design data onto a physical chip. For example, in accordance with the method of fabrication described by flowchart 600 below.

FIG. 5b shows a flowchart 520 depicting an alternative embodiment of the method for designing a semiconductor. In the alternative embodiment, the method may further consider the correct metal layer of the semiconductor. This is because pins may only be placed on metal layers available to the respective unit. In principle, the metal layer is selected depending on the length of the pin to pin distance according to the pin line (the line between the unit center and the chip pin). Thereby, it should be kept in mind that for a unit, a limited, predefined number of metal layers may be available, of which only a few may be used for unit pins (typically, the top four of eight layers). For this reason, the pin lines may be assigned to buckets which relate to the number of usable metal layers of the semiconductor. Then, the buckets may be sorted by groups according to length. The sorting may be performed in multiple ways, including top-down or bottom-up (i.e. by increasing length or decreasing length).

Embodiments of the method described by FIG. 5b may begin at step 522 wherein a list comprising chip pin positions, at least one net-name, available positions for unit pins, required unit pins, one or more constraints (for example, net costs reflecting the constraints), and optionally one or more additional variables. The procedure starts at step 524, and in step 526, a determination of the center point of the unit is made.

In step 528, all of the pin lines are determined and assigned, according to length-based buckets where the pin line is assigned. In some embodiments, additional inputs may be provided in step 530, according to which buckets are assigned to specific pin lines, and the corresponding selected metal layer. In step 532 all of the buckets are sorted, as either top-down or bottom-up, according to their length. In step 534, a first bucket is selected, and the first run begins with the first bucket.

In step 536, the first (or next) pin line is selected. An intersection point is determined, and the unit pin is moved to the newly determined intersection point. In step 538, a determination is made whether or not all pin lines have been addressed for the bucket selected in step 534. If not all of the pin lines have been addressed, the procedure returns to step 536 continuing with the next pin line and plots the next intersection point for placement of the unit pin. Otherwise, if the determination in step 538 is made that all pin lines for the selected bucket have been completed, the method may proceed to step 540. In step 540, it is further determined whether all buckets have been addressed. If all of the buckets for the unit have not been addressed, the method returns to step 534 and continues with the next bucket assigned to the next usable metal layer of the semiconductor. Likewise, if in step 540, it is determined that all buckets have been completed, the method proceeds to step 542 and ends. In some embodiments, upon completion of the method for designing semiconductor circuit at step 542, the design of the semiconductor circuit may be outputted and/or stored as physical data. Embodiments of the semiconductor design data describing the semiconductor circuit may be used for fabricating the semiconductor circuit in accordance with the design described by semiconductor design data onto a physical chip. For example, in accordance with the method of fabrication described by flowchart 600 below.

FIG. 6 illustrates a flowchart 600 depicting a method for having a semiconductor circuit fabricated using physical design data of the semiconductor circuit designed by the one or more method steps described by flowcharts 500, 520 and/or the embodiments described in detail herein. Embodiments of the method depicted by flowchart 600 may be a continuation of the semiconductor circuit design steps described by the embodiments of flowchart 500 or flowchart 520 in some instances. For example, in situations where there may be seamless integration between semiconductor circuit design and fabricating the semiconductor circuit according to the semiconductor design data outputted by method for designing semiconductor circuits as described herein. In alternate instances, the semiconductor design phase and fabrication phases may be performed by separate and/or distinct entities. For example, designers and fabricators may be different individuals, businesses, corporations, firms, etc. In situations where the semiconductor circuit designer and fabricator are separate entities, the semiconductor designer may design the semiconductor circuit in accordance with one or more method steps described by flowcharts 500, 520, and/or as described herein and generate, as output of the method for designing the semiconductor circuit, semiconductor circuit design data describing the semiconductor design. The semiconductor circuit design data can be provided to a fabricator. Based on the semiconductor circuit design data, the fabricator can fabricate the semiconductor circuit onto a physical chip, in accordance with the semiconductor design provided, as depicted by one or more method steps described in flowchart 600.

In step 602 of flowchart 600, semiconductor circuit design data, based (at least in part one the design(s) of the semiconductor design outputted by one or more steps of the methods described by flowchart 500 and/or flowchart 520 is obtained or provided. Embodiments of the semiconductor circuit can be fabricated according to one or more known processes as generally described by the steps of flowchart 600 using the semiconductor circuit design data obtained or provided in step 602. Generally, a wafer with multiple copies of the final semiconductor circuit design can be fabricated and cut (i.e. diced) in such a manner that each of the die cut from the wafer comprises a copy of the semiconductor circuit. At step 604, the process of fabricating the semiconductor circuit can include fabricating masks for lithography, based on the finalized physical layout of the semiconductor circuit. At step 606, the wafer is fabricated using the masks created in step 604, to perform photolithography and etching of the semiconductor circuit onto each die of the wafer. The individual dies of the wafer comprising the copies of the fabricated semiconductor circuit may be diced into each individual die. in step 608, each individual die comprising the semiconductor circuit may be tested and sorted in order to filter out any potentially faulty die.

As mentioned above, a series of constraints may also be reflected in the determination of the correct unit pin position on the boundary of the unit. Besides other net constraints, slack and slew of the signals can be taken into account. If there is a timing model available and also assertions for each pin, it is possible to determine wire codes and metal layers and assign the correct metal layer to the pins. Often the problem exists wherein the user designing the semiconductor may only know the timing information for a given unit or core. However, as described above, users may receive the xy-position of the unit and for each connected net by a pin chip coordinate file, where that position may be stored. For a timing model, the arrival time $t_{ATFarEnd}$ is stored in the pin chip coordinate file. Moreover, with the arrival time of the related near end, $t_{ATNearEnd}$, embodiments described herein may determine an available net timing delay as: $\Delta t_{net} = t_{ATFarEnd} - \text{end } t_{ATNearEnd}$.

With a timing model and the net length, the algorithm determines, for each net, the best metal layer to use for routing and for the pins. With the given timing above, timing data is determined according to the available timing delay $\Delta t_{net}$ for a net. In some instances, the algorithm "is aware" of details of the technology used, like the specific resistive-capacitive (RC) delay of each metal layer (typically depending on the size, in both directions, of the metal wire) and the selected width to calculate the layer and the width RC delay $\Delta t_{LayerWidth}$. With both information components, the algorithm selects the best wire constraint for a given net and also for the pin to achieve a $\Delta t_{LayerWidth} > \Delta t_{net}$.

In some embodiments, the logic describing which net connections and interfaces are available on the chip between the different units may be provided as part of the netlist, pin chip coordinate file and/or pin position data. Some embodiments described herein may be adapted to use a logic model to obtain information about each net source(s) or sink(s) of the semiconductor. The netlist information can also be used to obtain the placement information for the chip.

In some embodiments, all of the logic can be placed on a schematic of the chip so that the schematic (or floor plan, $f_t$) represents the current logic release $l_r$. The nominal logic development can be a parallel development process. Within logic of the chip schematic, the interfaces may be defined between the units on the chip, but implementation is sometimes not within the same time frame (for example, not having the same timestamp). In some cases, the nets are not completely connected. However, despite the nets of the semiconductor not being completely connected, the logic contained within the schematic of the chip define incoming or outgoing connections from which an interface of a sub-net is connected. In some other cases, a chip may comprise a new logic $l_{r+1}$ and a floor plan $f_r$. Based on this, new positions for unit pins can be determined. The proposed concept may be instrumental to do this. Therefore, the proposed concept may not only be used in the beginning of a wiring process of a semiconductor, but also at the end and/or in between different development steps of the chip. In some instances, unit pins may already be placed onto the unit at a time at which single logical blocks are not completely defined, resulting in interfaces between the logical blocks that are not yet completely defined in an underlying model. Hence, a logical description of the interface nets may be sufficient to use the proposed concepts described herein.

Referring to the drawings, FIG. 7 shows a block diagram of an embodiment of a semiconductor circuit design system 700 for placing a unit pin on a boundary of a unit of a semiconductor circuit. The system 700 comprises a receiver, in particular a receiver 702, adapted for receiving pin position data. Embodiments of the pin position data may comprise a chip pin position of a chip pin within the chip area that is outside of the unit to which the unit pin is configured to be electrically connected. The pin position data can be provided by an underlying netlist describing positions and connections between selected active and passive electronic components of the chip.

Embodiments of system 700 may further comprise a first determining means which may include a first determination module 704 configured or adapted for determining coordinates of a center point of the unit, and can include a second determination module 706 adapted or configured to determine a line crossing the center point of the unit and the chip pin position. Embodiments of system 700 can include a positioning module 708 adapted or configured to place the unit pin at the point of intersection at a boundary of the unit and the pin line extending from the center point of the unit to the chip pin.

It may also be noted that units and/or modules may be selectively connected to each other in order to exchange electrical signals carrying and transmitting data to and/or from one or the other unit and/or module. This refers mainly to the receiver 702, the first determination unit module 704, the second determination module 706 and the positioning module 708. Alternatively, to the selective connections between the module/units, they may also be connected to a system internal bus system 710.

Embodiments of the semiconductor system 700 may output and/or store semiconductor circuit design data describing the physical layout of the semiconductor circuit. The semiconductor circuit design data may be sharable and/or transferrable to one or more semiconductor circuit fabricators or fabrication systems capable of fabricating the semiconductor circuit described by the design data onto a physical chip. For example, providing the design data to a fabrication system capable of performing fabrication in accordance with one or more steps generally described by the method of fabrication depicted in flowchart 600 and/or as described herein. In some embodiments, system 700 may be capable of performing both semiconductor circuit design and fabrication phases. In alternate embodiments, system 700 may perform semiconductor circuit design functions and one or more separate fabrication systems may fabricate the semiconductor circuit designs onto the physical chips (i.e. the individual die).

Embodiments of the invention may be implemented together with virtually any type of computer, regardless of the platform being suitable for storing and/or executing program code. FIG. 8 shows, as an example, a computing system 800 suitable for executing program code related to the proposed method. The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove.

In the computer system 800, there are components, which are operational with numerous other general purpose or special purpose computing system environments or configurations. Examples of well-known computing systems, environments, and/or configurations that may be suitable for use with computer system 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 800 may be described in the general context of computer system-executable instructions, such as program modules, being executed by the computer system 800. Generally, program modules may include routines, programs, objects, components, logic, data structures, and so on that perform particular tasks or implement particular abstract data types. Embodiments of computer system 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system 800 is shown in the form of a general-purpose computing device. The components of computer system 800 may include, but are not limited to, one or more processors or processing units 802, a system memory 804, and a bus 806 that couples one or more system components together, including system memory 804 to the processing unit 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 800 may include one or more types of computer system readable media. Such media may be any available media that is accessible by computer system 800, and it may include both, volatile and/or non-volatile media, removable and/or non-removable media.

The system memory 804 may include computer system readable media in the form of volatile memory, such as random-access memory (RAM) 808 and/or cache memory 810. Computer system 800 may further include other removable/non-removable, volatile/non-volatile computer system storage media. By way of example only, a storage system 812 may be provided for reading from and writing to a non-removable, non-volatile magnetic media (not shown and may typically be referred to as a "hard drive", "hard disk" or "solid state drive"). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention, including but not limited to the first determination module 704, second determination module 706 and positioning module 708 (as shown in FIG. 7).

A program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system 800 may also communicate with one or more external devices 818 such as a keyboard, a pointing device, a display 820, etc.; one or more devices that enable a user to interact with computer system 800; and/or any devices (e.g., network card, modem, etc.) that enable computer system 800 to communicate with one or more other computing devices (for example, over a communications network). Such communication can occur via Input/Output (I/O) interfaces 814. Embodiments of computer system 800 may communicate with one or more networks such as a local area network (LAN), a general wide area network (WAN), and/or a public network (e.g., the Internet) via network adapter 822. As depicted, network adapter 822 may communicate with the other components of the computer system 800 via bus 806. It should be understood that, although not shown, other hardware and/or software components could be used in conjunction with computer system 800. Examples, include, but are not limited to microcode, device drivers, redundant processing units, external disk drive arrays, RAID systems, tape drives, and data archival storage systems, etc.

Additionally, the semiconductor circuit design system 700 for placing a unit pin at a boundary of a unit of a semiconductor circuit may be attached to the bus system 806 and/or integrated into the computer system 800 as one or more components and/or program module 816.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for designing a semiconductor circuit, the method comprising:
    receiving pin position data, the pin position data comprising a chip pin position of a chip pin within a chip area that is outside of a unit to which a unit pin is configured to be electrically connected;
    determining coordinates of a center point of the unit;
    determining a position of a line extending from the center point of the unit to the chip pin position; and
    placing the unit pin on a boundary of the unit where the line extending from the center point of the unit to the chip pin position intersects the boundary of the unit.

2. The method according to claim 1, wherein the center point corresponds to a geometric center of an area of the unit.

3. The method according to claim 1, wherein the chip pin position is a center point of another unit.

4. The method according to claim 1, wherein the unit has a convex geometry.

5. The method according to claim 1, wherein the line is a straight line crossing the center point and the chip pin.

6. The method according to claim 1, wherein the line is defined by a function, and wherein the method further comprises:
    varying at least one parameter of the function until an overlap of the unit pin's placement and previously placed unit pins are avoided.

7. The method according to claim 1, also comprising placing multiple unit pins iteratively, wherein an order of placing the unit pins is based on design constraint information.

8. The method according to claim 7, wherein the design constraint information comprises a set of metal layer positions within the semiconductor circuit that are usable for placing the unit pin.

9. The method according to claim 8, wherein usability of the set of metal layer positions for placing the unit pin is determined based on a length of a line between the chip pin and the unit pin, and wherein the method comprises sorting the unit pins according to the length of the lines extending from the chip pin and respective unit pin being placed.

10. The method according to claim 1, wherein a constraint for the placing the unit pin is a pre-selected side of the boundary of the unit.

11. A system for designing a semiconductor circuit, the system comprising:
a receiver configured to receive pin position data, the pin position data comprising a chip pin position of a chip pin within a chip area that is outside of a unit to which the unit pin is configured to be electrically connected;
a determination module configured to determine coordinates of a center point of the unit;
a second determination module configured to determine a position of a line extending from the center point of the unit to the chip pin position; and
a positioning module configured to place the unit pin on a boundary of the unit where the line extending from the center point of the unit to the chip pin position intersects the boundary of the unit.

12. The system according to claim 11, wherein the center point corresponds to a geometric center of an area of the unit.

13. The system according to claim 11, wherein the chip pin position is a center point of another unit.

14. The system according to claim 11, wherein the unit has a convex geometry.

15. The system according to claim 11, wherein the line is a straight line crossing the center point and the chip pin.

16. The system according to claim 11, wherein the line is defined by a function, and wherein the positioning module configured to vary at least one parameter of the function until an overlap of the unit pin and previously placed unit pins are avoided.

17. The system according to claim 11, wherein the positioning module is configured to place multiple unit pins iteratively, wherein an order of placing the unit pins is based on design constraint information.

18. The system according to claim 17, wherein the design constraint information comprises a set of metal layer positions within the semiconductor circuit that are usable for placing the unit pin.

19. The system according to claim 18, wherein usability of the set of usable metal layer positions for placing the unit pin is determined based on a length of the line between the chip pin and the unit pin, and wherein the method comprises sorting the unit pins according to the length of lines extending from the chip pin and respective unit pin being placed.

20. A computer program product for designing a semiconductor circuit, the computer program product comprising a computer readable storage medium having program instructions embodied therewith, said program instructions being executable by one or more computing systems or controllers to cause said one or more computing systems to execute a computer-implemented method comprising:
receiving pin position data, the pin position data comprising a chip pin position of a chip pin within a chip area that outside of a unit to which the unit pin is configured to be electrically connected;
determining coordinates of a center point of the unit;
determining a position of a line extending from the center point of the unit to the chip pin position; and
placing the unit pin on a boundary of the unit where the line extending from the center point of the unit to the chip pin position intersects with the boundary of the unit.

21. The computer program product of claim 20, wherein the computer-implemented method being executed further comprises:
placing multiple pins iteratively, wherein an order of placing the unit pins is based on design constraint information, wherein design constraint information comprises a set of metal layer positions within the semiconductor circuit that are usable for placing the unit pin.

22. The computer program product of claim 21, wherein the computer-implemented method being executed further comprises:
determining usability of the set of metal layer positions for placing the unit pin based on a length of the line between the chip pin and the unit pin, and wherein the method comprises sorting the unit pins according to the length of the unit pins' lines between the chip pin and respective unit pin being placed.

23. A computer system comprising:
at least one processor;
a semiconductor design system coupled to the at least one processor, the semiconductor design system comprising a receiver, a first determination module, a second determination module and a positioning module; and
a computer-readable storage media coupled to the at least one processor, wherein the computer-readable storage media contains program instructions executing a computer-implemented method comprising:
receiving, by the at least one processor, pin position data from the receiver, the pin position data comprising a chip pin position of a chip pin within a chip area that is positioned outside of a unit to which a unit pin is configured to be electrically connected;
receiving, by the at least one processor, coordinates of a center point of the unit determined by a determination module;
positioning, by the at least one processor, a line extending from the center point of the unit to the chip pin position; and
instructing, by the at least one processor, placement of the unit pin on a boundary of the unit, where the line extending from the center point of the unit to the chip pin position intersects the boundary of the unit.

24. The computer system of claim 23, wherein the step of positioning the line extending from the center point of the unit to the chip pin position is defined by a function and the computer-implemented method further comprises:
varying, by the at least one processor, at least one parameter of the function until an overlap of the unit pin's placement and previously placed unit pins are avoided.

25. A computer-implemented method comprising:
receiving, by a processor, a chip pin coordinate file comprising xy coordinates of a unit, and xy coordinates of a chip pin;
establishing, by the processor, a center point of the unit based on the xy coordinates of the unit;
extending, by the processor, a pin line from the center point of the unit to the xy coordinates of the chip pin;
identifying, by the processor, an intersection point, wherein the pin line intersects with a boundary of the unit as the pin line extends from the center point of the unit to the xy coordinates of the chip pin; and
confirming, by the processor, that a pin is not positioned at the intersection point, and upon confirmation that the pin is not positioned at the intersection point, placing, by the processor, a unit pin on the boundary of the unit at the intersection point.

* * * * *